Nov. 24, 1936.　　　F. J. WILLIAMS　　　2,061,819
FREEZING TRAY AGITATOR
Filed Jan. 24, 1936
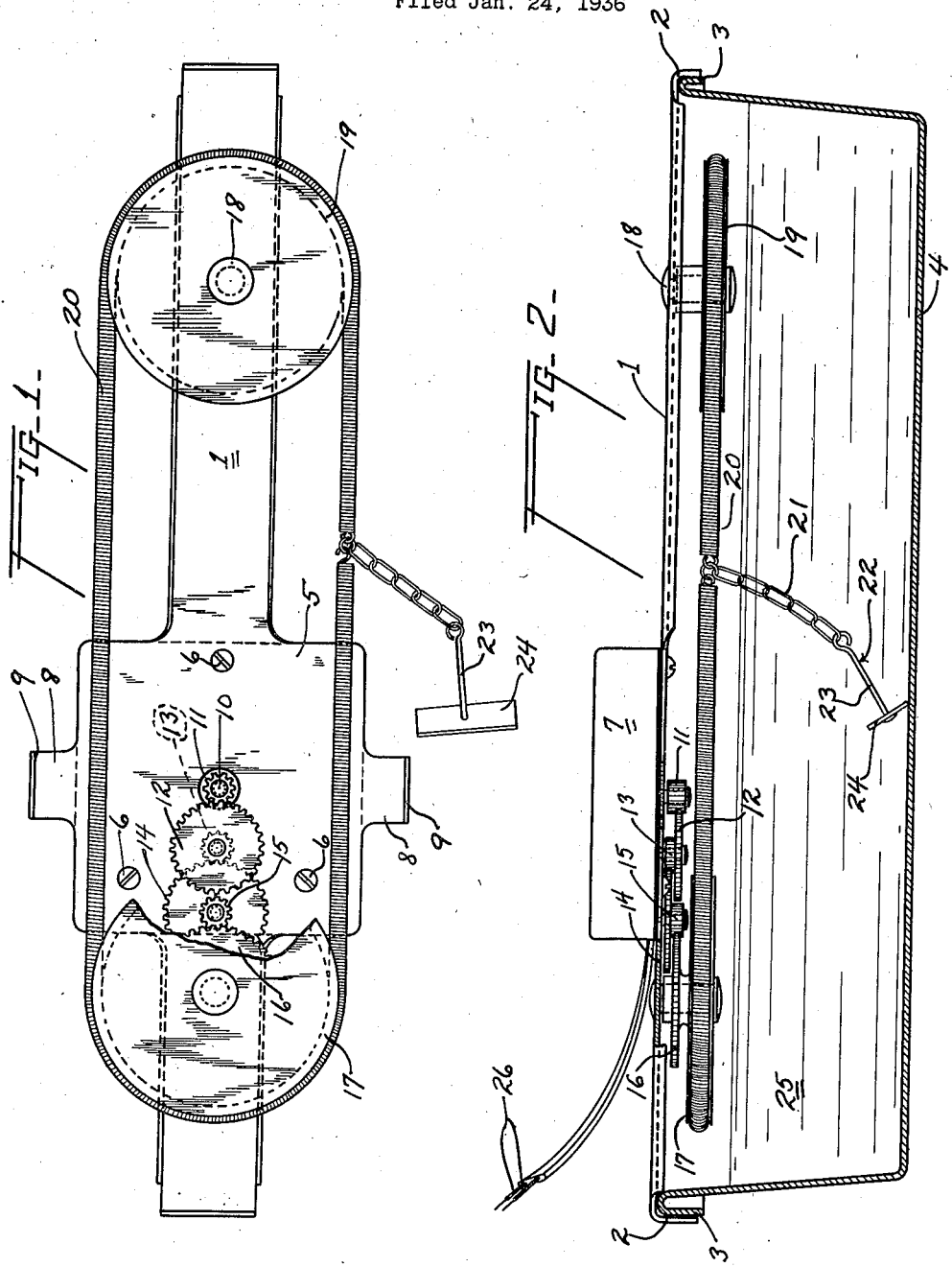
Floyd J. Williams
INVENTOR
BY Loyal J. Miller
ATTORNEY Patented Nov. 24, 1936

2,061,819

UNITED STATES PATENT OFFICE 2,061,819

FREEZING TRAY AGITATOR

Floyd J. Williams, Oklahoma City, Okla.

Application January 24, 1936, Serial No. 60,568

3 Claims. (Cl. 259—102)

My invention relates to agitators for liquids and particularly to agitators for use in connection with freezing pans of mechanical refrigerators.

In freezing commodities such as sherbets, custards, ice cream, and the like, it is necessary that the commodity be stirred during the freezing process in order to produce a smooth product and to preclude possibility of crystallization. In manufacturing such products in the home, the usual freezing pan of the mechanical refrigerator is usually employed as a container for the commodity.

The prime object of the present invention is the provision of a mechanical agitator which may be removably installed upon a usual freezing pan, and which will eliminate supervision of the freezing process.

Other objects of the invention are to provide a device of this class which is new, novel, practical and of utility; which is sufficiently compact to be used in the usual freezing compartment of a usual mechanical refrigerator; which will positively agitate a freezing commodity and prevent crystallization; which is completely embodied in the lid of a freezing pan and may be easily and quickly installed upon and removed from the pan; which will agitate the commodity to move in varying directions; which embodies an agitating element being free to move in the commodity along the line of least resistance and which is free to raise in the commodity and pass over any portion of the commodity which has become solidly frozen, thus stirring only the unfrozen portion of the commodity; the stirring element of which may be easily removed from the commodity after it has been frozen; which is positive in action; the manufacturing cost of which will not be prohibitive; which is durable; and, which will be efficient in accomplishing all the purposes for which it is intended.

With these and other objects in view as will more fully appear hereinbelow, my invention consists in the construction, novel features, and combination of parts hereinafter more fully described, pointed out in the claims hereto appended, and illustrated in the accompanying one-sheet drawing, of which, Figure 1 is a bottom plan view with a portion broken away; and, Figure 2 is a side elevational sectional view of a usual freezing pan showing the device operatively installed.

Like characters of reference designate like parts in all the figures.

It is understood that various changes in the form, proportion, size, shape, weight, material and other details of construction, within the scope of my invention may be resorted to without departing from the spirit or broad principle of my invention and without sacrificing any of the advantages thereof; and it is also understood that the drawing is to be interpreted as being illustrative and not restrictive.

The inventive idea involved is capable of receiving a variety of mechanical expressions one of which, for the purpose of illustrating the invention, is shown in the accompanying drawing wherein:—

The reference numeral 1 represents as a whole a substantially flat metal strip or lid having at each end a downwardly curved portion 2 for fitting over the end rims 3 of a usual freezing pan 4. Intermediate its ends the element 1 is provided with a self-formed widened portion 5 to the nether surface of which is attached by any suitable means such as detents 6 an electric motor or power element 7. The widened portion 5 of the element 1 is equipped with outstanding extensions 8 each of which is provided with a depending lip 9 for engaging the upper rim of the sides of the pan for holding the element 1 rigidly yet removably in place upon the pan.

The armature, not shown, of the motor is provided with a depending shaft 10 to which is keyed or otherwise rigidly attached a drive pinion 11. The drive pinion 11 acts through a gear train consisting of other pinions 12, 13, 14, 15, and 16 to drive a grooved pulley 17. All of the pinions 12 to 16 inclusive as well as the pulley 17 are journaled on shafts carried by the element 1.

Spaced from the pulley 17 and located adjacent the opposite end of the element 1 from the end which the pulley 17 is provided a stationary shaft 18 which depends from the element 1 and upon the depending portion of which is journaled a second grooved pulley 19. A suitable belt 20 is mounted upon the two pulleys 17 and 19 and a suitable chain or flexible element 21 to the free end of which is attached a suitable agitating element 22. The belt 20 may be of any suitable material but preferably is formed of a helical spring so that a proper amount of tension may at all times be present. The agitating element 22 is mounted upon the flexible element 21 in such a manner that it is free to move in any direction with relation to the element 21.

The element 22 preferably consists of a shank 23 with a blade 24 rigidly attached to its free end. The blade 24 is preferably disposed perpendicularly to the shank 23.

In operation a commodity, indicated in Fig. 2 by the reference numeral 25, will be placed in the pan 4. The element 1 will be installed upon the upper orificial rim of the pan with the flexible element 21 and the agitating element 22 depending into the commodity. The motor 7 will then be energized by current delivered thereto from a seat of electrical energy, not shown, through conductors 26. The driving pinion 11 and the gear train will cause rotation of the pulley 17 which through the action of the belt 20 will also cause rotation of the pulley 19, thus propelling the elements 21 and 22 through commodity. At the beginning of such operation the blade 24 will be dragged along the bottom of the pan 4, but as the commodity becomes frozen the blade will raise sufficiently to pass over the portion of the commodity which has become frozen and will therefore agitate only that portion of the commodity which is not frozen. Due to the fact that the freezing will always take place first in the bottom of the pan as the frozen portion of the commodity increases the blade will automatically continue to raise until the commodity is completely frozen, at which time the blade will be dragged along the top of the frozen commodity without acting as an agitating element. It is further pointed out that the element 22 will not move at all times in a single path but will be free to move transversely with relation to its direction of travel and therefore during its travel will cover the entire width as well as the entire length of the pan. Even though the motor is not stopped immediately upon the commodity becoming frozen no damage will result to the mechanism because of the fact that when the commodity is frozen the blade 24 no longer is imbedded therein but slides upon the top of the commodity.

Obviously, the invention is susceptible of embodiment in forms other than that which is illustrated in the accompanying drawing and described herein, and applicable for uses and purposes other than as detailed, and I therefore consider as my own all such modifications and adaptations and other uses of the form of the device herein described as fairly fall within the scope of my invention.

Having thus described my invention, what is claimed and desired to be secured by Letters Patent, is:

1. In a device of the class described, the combination with a pan, of an agitator attachment therefor including: a bracket adapted for removable disposition over the orifice of the pan, spaced pulleys carried by the bracket, a conveyor carried by the pulleys, a flexible agitating element comprising a blade carried by the free end of a chain, the other end of the chain being connected to the conveyor, said element depending into the pan and driven to movement therein by the conveyor, and means for driving one of the pulleys to rotation.

2. In a device of the class described, the combination with a pan, of an agitator attachment therefor including: a removable lid for the pan, spaced pulleys carried by the nether surface of the lid, a conveying element carried by the pulleys, an agitating element comprising a blade carried by the free end of a chain, the other end of the chain being connected to said conveying element, and means for driving one of the pulleys to rotation.

3. In a device of the class described, the combination with a freezing pan, a bracket adapted for removable disposition over the orifice thereof, spaced pulleys carried by the bracket, a conveyor carried by the pulleys, and means for driving one of the pulleys, of an agitating element including a blade carried by the free end of a chain, the other end of the chain being connected to the conveyor, the chain and blade depending into the pan.

FLOYD J. WILLIAMS.